(12) United States Patent
Jones

(10) Patent No.: US 7,719,409 B1
(45) Date of Patent: May 18, 2010

(54) HITCH MOUNTING ASSISTING SYSTEM

(76) Inventor: Adam C. Jones, 3432 Autumnwoods Dr., Chaska, MN (US) 55318

( * ) Notice: Subject to any disclaimer, the term of this patent is extended or adjusted under 35 U.S.C. 154(b) by 296 days.

(21) Appl. No.: 12/015,120

(22) Filed: Jan. 16, 2008

(51) Int. Cl.
*G08B 21/00* (2006.01)

(52) U.S. Cl. ............... 340/431; 340/686.2; 280/477

(58) Field of Classification Search ............. 340/431, 340/815.4, 901, 435, 436, 438, 644, 686.2; 280/477, 478.1, 479.1; 180/9.4
See application file for complete search history.

(56) References Cited

U.S. PATENT DOCUMENTS

| | | | |
|---|---|---|---|
| 3,734,539 A | 5/1973 | Salmi | |
| 3,938,122 A | 2/1976 | Mangus | |
| 4,173,353 A | 11/1979 | Steele | |
| 4,187,494 A | 2/1980 | Jessee | |
| 4,432,563 A | 2/1984 | Pitcher | |
| 5,513,870 A | 5/1996 | Hickman | |
| 5,650,764 A * | 7/1997 | McCullough | ........... 340/431 |
| 5,821,852 A | 10/1998 | Fairchild | |
| 6,178,650 B1 * | 1/2001 | Thibodeaux | ............. 33/286 |
| 7,568,716 B2 * | 8/2009 | Dietz | ................... 280/477 |
| 7,584,983 B2 * | 9/2009 | McKenney | .............. 280/477 |

* cited by examiner

*Primary Examiner*—Toan N Pham

(57) ABSTRACT

A hitch mounting assisting system includes a hitch and a hitch connector. A housing is removably mounted on the hitch. The housing has an opening therein. A tether has a free end extending through the opening and removably coupled to the hitch connector. A shaft is rotatably mounted in the housing. A first switch and a second switch are mounted in the housing. The shaft actuates the first switch when the shaft rotates in a first direction and actuates second switch when the shaft rotates in a second direction. The tether rotates the shaft in the first or second directions relative to a direction of misalignment between the hitch and hitch connector. A display screen is in communication with the first and second switches. The display screen indicates required movement of the hitch relative to the hitch connector to align the hitch and the hitch connector.

10 Claims, 6 Drawing Sheets

HITCH MOUNTING ASSISTING SYSTEM

BACKGROUND OF THE INVENTION

Field of the Invention

The present invention relates to hitch alignment devices and more particularly pertains to a new hitch alignment device for assisting a person in aligning a hitch when coupling a vehicle to a trailer.

SUMMARY OF THE INVENTION

The present invention meets the objectives presented above by generally comprising a hitch and a hitch connector. A housing is removably mounted on the hitch. The housing has an opening therein positioned in a front side of the housing. A tether has a free end extending through the opening and is selectively retracted toward or pulled away from the housing. The free end of the tether is removably coupled to the hitch connector. The front side of the housing is aligned with a correct alignment of the hitch and the hitch connector. A shaft is rotatably mounted in the housing. A first switch and a second switch are mounted in the housing. The shaft actuates the first switch when the shaft rotates in a first direction and actuates second switch when the shaft rotates in a second direction. The tether is engaged with the shaft and rotates the shaft in the first or second directions relative to a direction of misalignment between the hitch and hitch connector. A display screen is in communication with the first and second switches. The display screen indicates required movement of the hitch relative to the hitch connector to align the hitch and the hitch connector.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
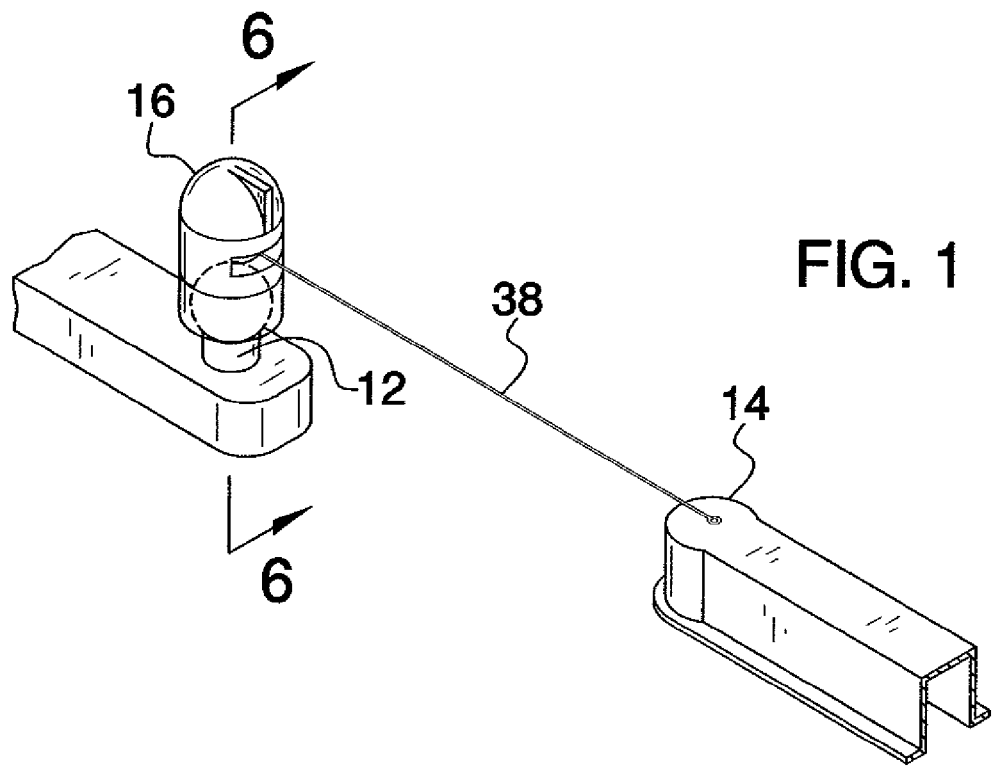
FIG. 1 is a perspective view of a hitch mounting assisting system according to the present invention.
Figure 2:
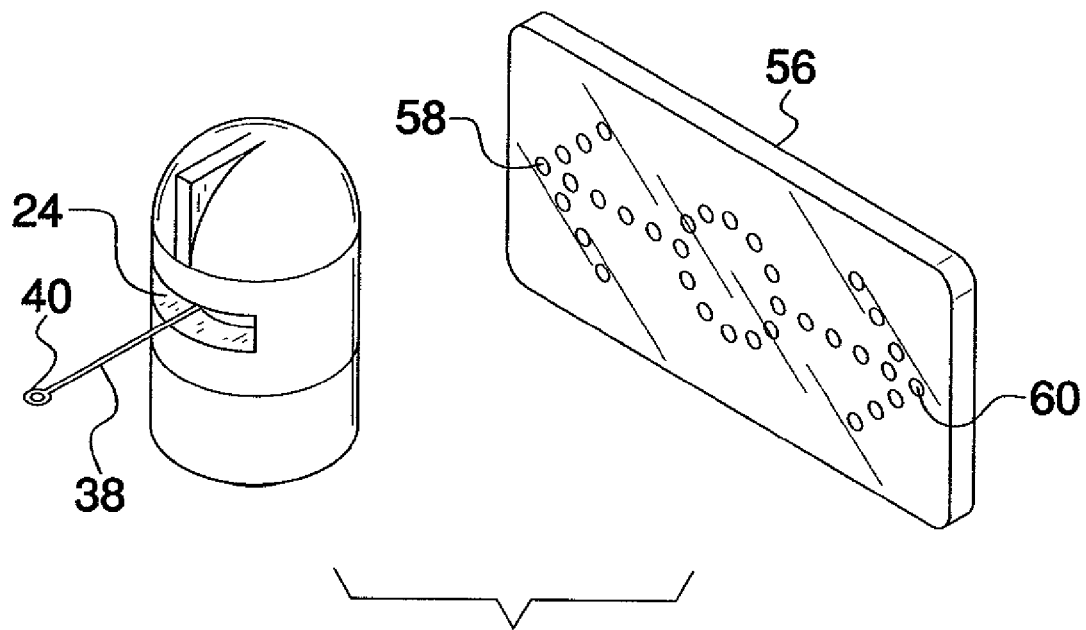
FIG. 2 is a perspective view of a housing and a display of the present invention.
Figure 3:
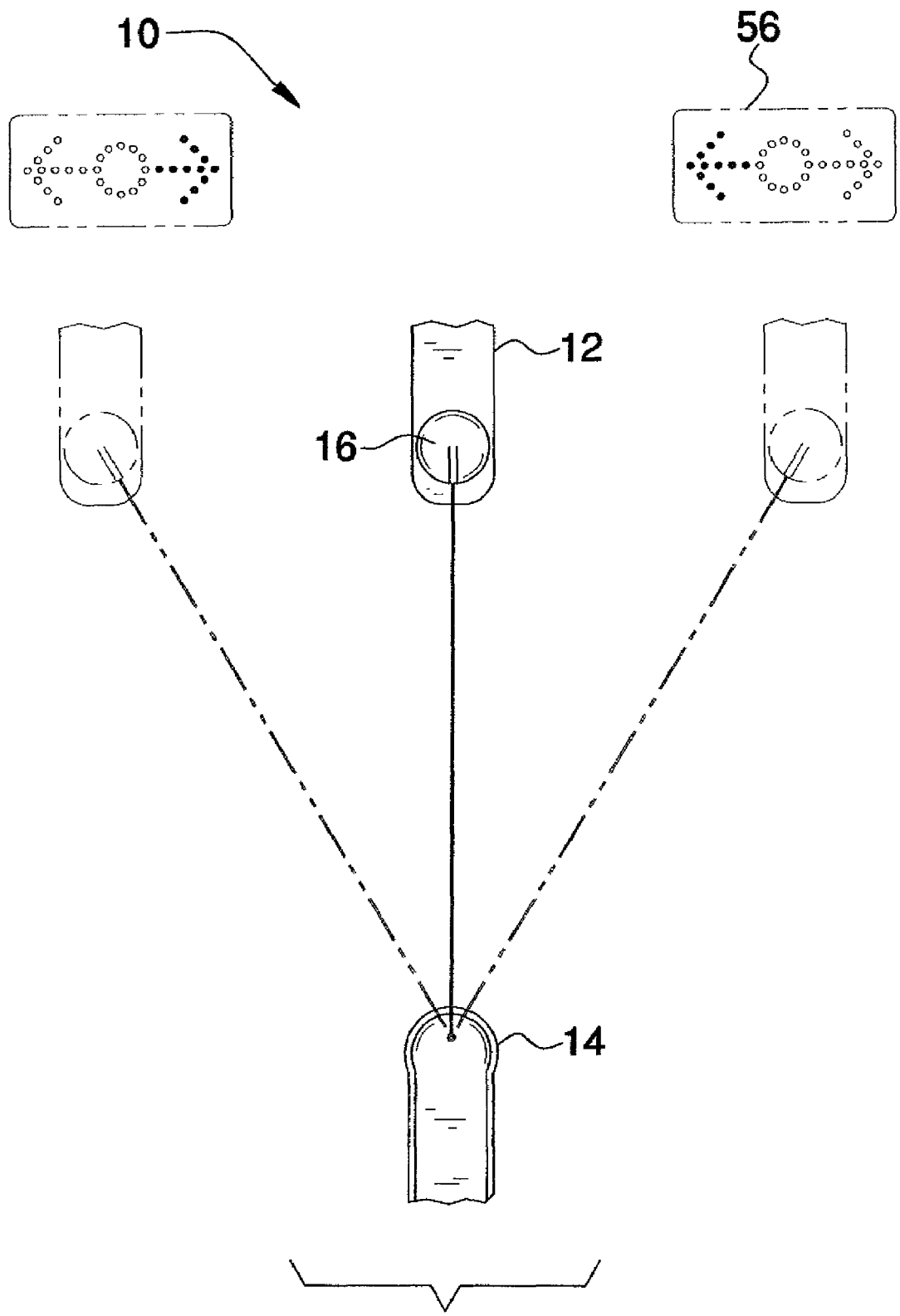
FIG. 3 is a top view of the present invention.
Figure 4:
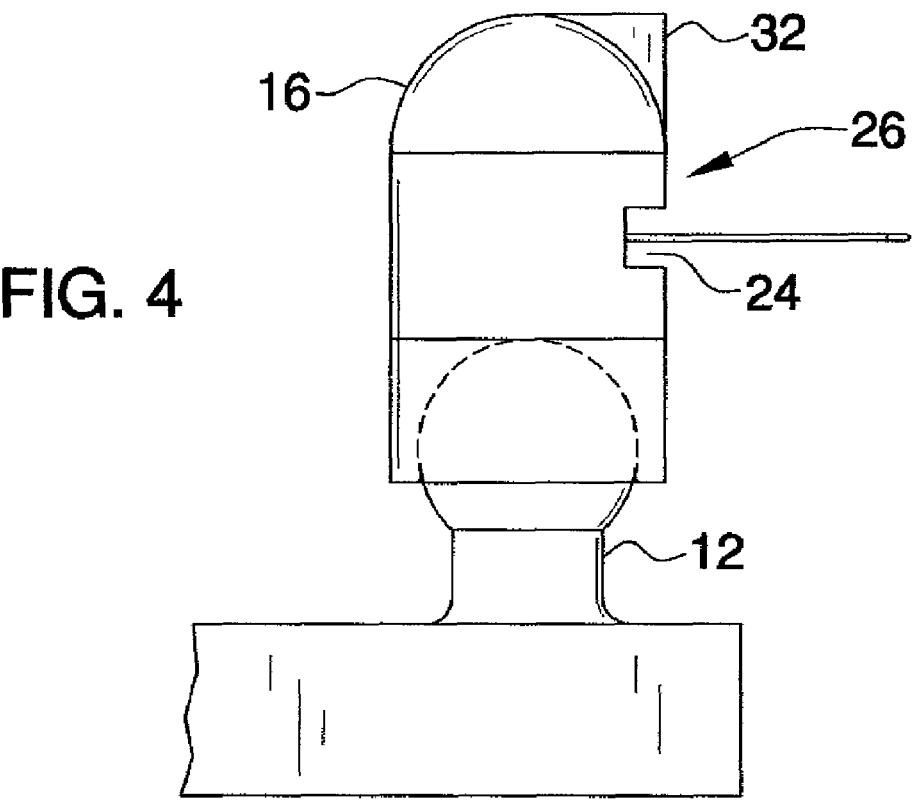
FIG. 4 is a side view of the housing of the present invention.
Figure 5:
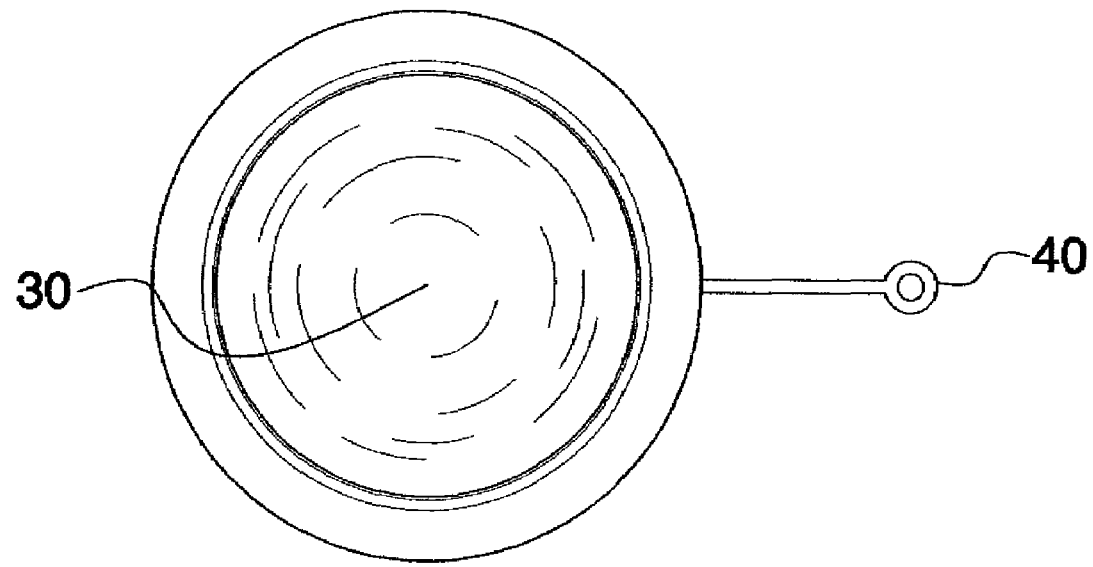
FIG. 5 is a bottom view of the housing of the present invention.
Figure 6:
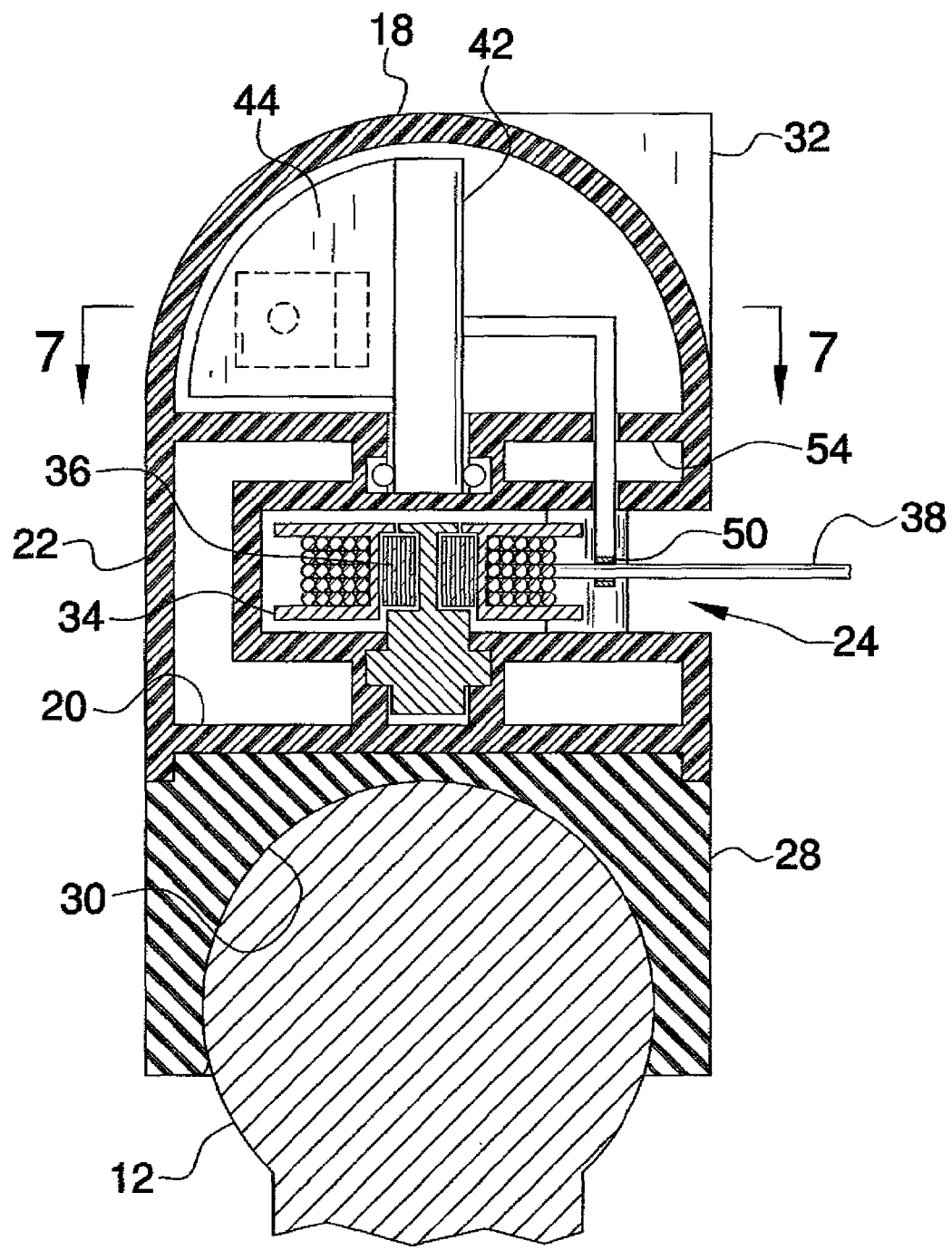
FIG. 6 is a cross-sectional view of the present invention taken along line 6-6 of FIG. 1.
Figure 7:
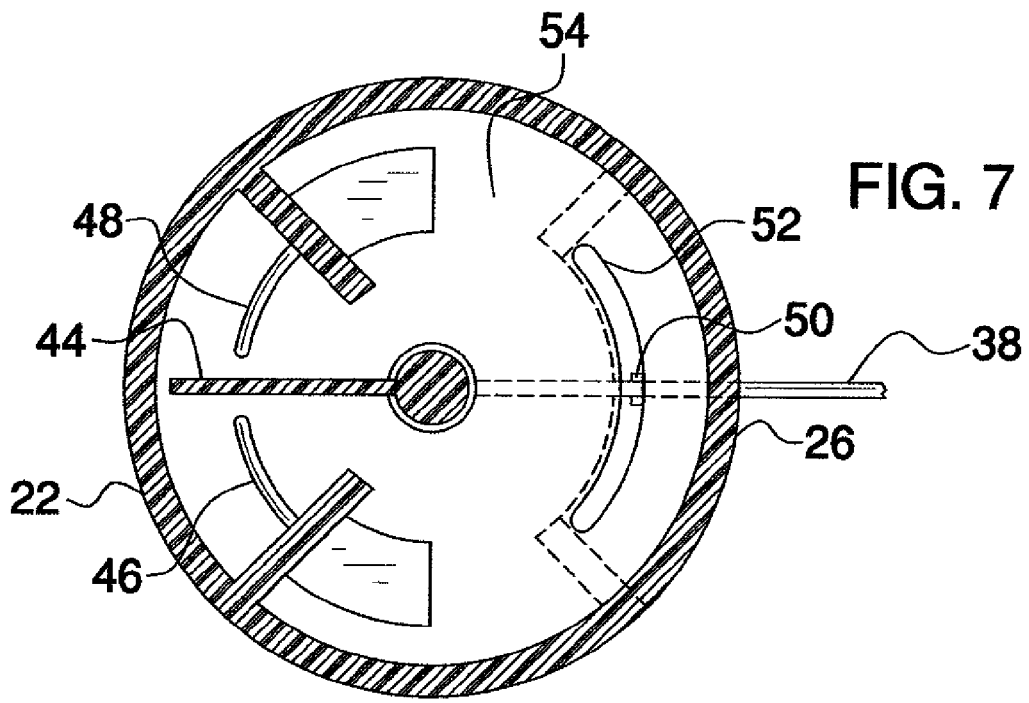
FIG. 7 is a cross-sectional view of the present invention taken along line 7-7 of FIG. 6.
Figure 8:
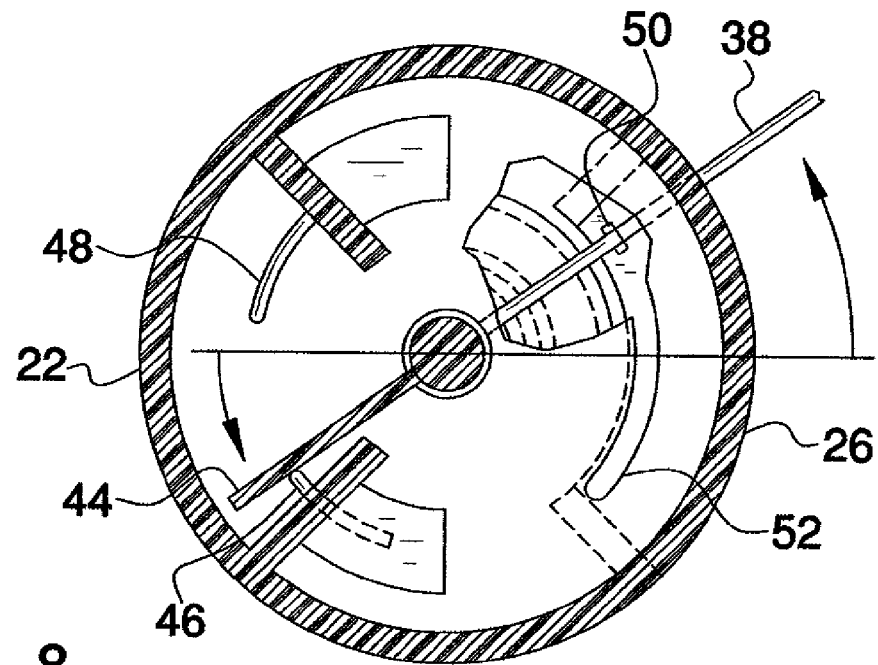
FIG. 8 is a cross-sectional view of the present invention.
Figure 9:
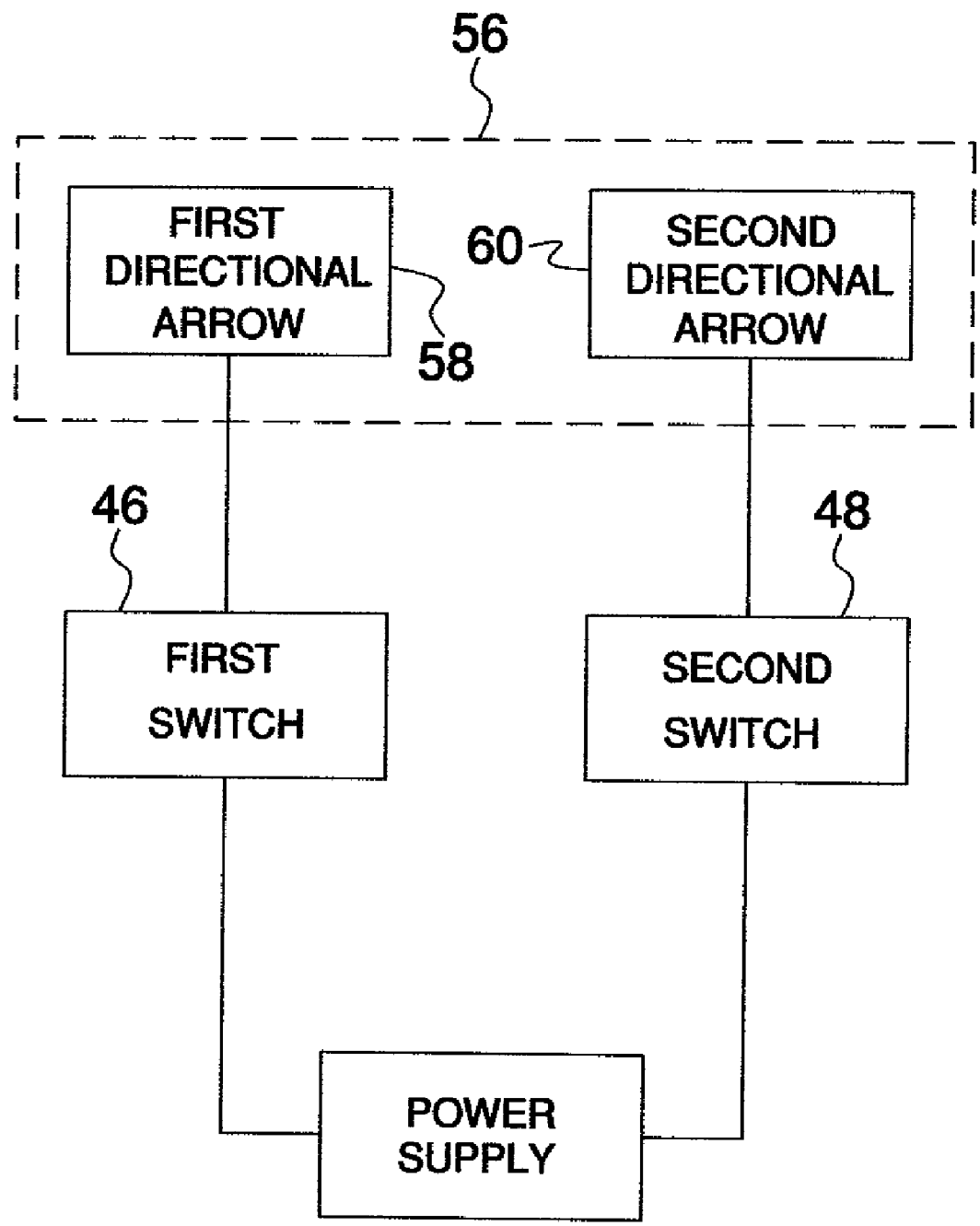
FIG. 9 is a schematic view of the present invention.

With reference now to the drawings, and in particular to FIGS. 1 through 9 thereof, a new hitch alignment device embodying the principles and concepts of the present invention and generally designated by the reference numeral 10 will be described.

As best illustrated in FIGS. 1 through 9, the hitch mounting assisting system 10 generally comprises a hitch 12 and a hitch connector 14. The hitch 12 and hitch connector 14 are conventional, with the hitch 12 typically coupled to a vehicle and hitch connector 14 to a trailer.

A housing 16 is removably mounted on the hitch 12. The housing 16 has a bottom wall 18, a top wall 20 and a peripheral wall 22 extending between and attached to the top 20 and bottom 18 walls. The peripheral wall 22 has an opening 24 therein. The opening 24 is positioned in a front side 26 of the housing 16. A coupler 28 is mounted on the housing 16 to frictionally couple the housing 16 to the hitch 12. The coupler 28 is attached to the bottom wall 18 and has a well 30 extending therein. The well 30 receives and frictionally couples to the hitch 12. A guide marker 32 is attached to the housing 16 and indicates for easy viewing the front side 32 of the housing 16.

A spool 34 is rotatably mounted in the housing 16. The spool 34 has a vertically oriented rotational axis extending through the top 18 and bottom 20 walls of the housing 16. Rotation of the spool 34 is biased in a first direction by a spring 36. A tether 38 is attached to and wound on the spool 34. The tether 38 has a free end 40 extending through the opening 24 in the housing 16. The free end 40 of the tether 38 is removably coupled to the hitch connector 14. The front side 26 of the housing 16 is aligned with a correct alignment of the hitch 12 and the hitch connector 14.

A shaft 42 is rotatably mounted in the housing 16. A plate 44 is attached to the shaft 42. The plate 44 is movable to a first position or a second position by the shaft 42. A first switch 46 is mounted in the housing 16 and a second switch 48 is mounted in the housing 16. The plate 44 actuates the first switch 46 when the plate 44 moves to a first position and actuates the second switch 48 when the plate 44 moves to a second position. The first 46 and second 48 switches may be pressure sensitive switches to indicate an amount of movement by the plate 44 toward either of the first 46 or second 48 positions.

A catch 50, or loop, is attached to the shaft 42 through a slot in a separating wall 54 and extends into the opening 24. The catch 50 receives and engages the tether 38. The catch 50 pivots the shaft 42 when the tether 38 moves laterally in the opening 24. In this manner, the plate 44 is moved to an angle corresponding to an angle of the tether 38 relative to the front side 26 of the housing 16.

A display screen 56 is in communication with the first 46 and second 48 switches. The display screen 56 may either be wirelessly or electrically in communication with the first 46 and second 48 switches. The display screen 56 indicates required movement of the hitch 12 relative to the hitch connector 14 to align the hitch 12 and the hitch connector 14. The hitch 12 requires movement to the left when the first switch 46 is actuated and movement to the right when the second switch 48 is actuated. The display screen 56 includes a pair of arrows 58, 60, each associated with one of the first 46 and second 48 switches, which are illuminated when their associated one of the first 46 and second 48 switches is actuated. The display screen 56 may be positioned in a rear window of the vehicle to ensure easy viewing by the person moving the hitch 12.

In use, the housing 16 is mounted on the hitch 12 and the tether 38 attached to the hitch coupler 14. The direction of the hitch 12 relative to the hitch coupler 14 determines the position of the panel 44 and which switch 46, 48, if either, is being actuated. The driver of the vehicle corrects the position of the hitch 12 accordingly until the hitch 12 and hitch connector 14 are aligned with each other.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hitch alignment assisting system comprising:
   a hitch and a hitch connector;
   a housing being removably mounted on said hitch, said housing having an opening therein positioned in a front side of said housing;
   a tether having a free end extending through said opening and being selectively retracted toward or pulled away from said housing, said free end of said tether being removably coupled to said hitch connector, said front side of said housing being aligned with a correct alignment of said hitch and said hitch connector;
   a shaft being rotatably mounted in said housing;
   a first switch and a second switch being mounted in said housing, said shaft actuating said first switch when said shaft rotates in a first direction and actuating second switch when said shaft rotates in a second direction;
   said tether being engaged with said shaft and rotating said shaft in said first or second directions relative to a direction of misalignment between said hitch and hitch connector; and
   a display screen being in communication with said first and second switches, said display screen indicating required movement of said hitch relative to said hitch connector to align said hitch and said hitch connector.

2. The system according to claim 1, further including a spool being rotatably mounted in said housing, said spool having a vertically oriented rotational axis, rotation of said spool being biased in a first direction, said tether being attached to and wound on said spool.

3. The system according to claim 1, further including a plate being attached to said shaft, said plate being movable to a first position or a second position by said shaft, said plate actuating said first switch when said plate moves to a first position and actuating said second switch when said plate moves to a second position.

4. The system according to claim 3, further including a catch being attached to said shaft and extending into said opening, said catch engaging said tether, said catch pivoting said shaft when said tether moves laterally in said opening.

5. The system according to claim 1, further including a guide marker being attached to said housing, said guide marker indicating said front side of said housing.

6. A hitch alignment assisting system comprising:
   a hitch and a hitch connector;
   a housing being removably mounted on said hitch, said housing having a bottom wall, a top wall and a peripheral wall extending between and attached to said top and bottom walls, said peripheral wall having an opening therein, said opening being positioned in a front side of said housing;
   a spool being rotatably mounted in said housing, said spool having a vertically oriented rotational axis, rotation of said spool being biased in a first direction;
   a tether being attached to and wound on said spool, said tether having a free end extending through said opening in said housing, said free end of said tether being removably coupled to said hitch connector, said front side of said housing being aligned with a correct alignment of said hitch and said hitch connector;
   a shaft being rotatably mounted in said housing;
   a plate being attached to said shaft, said plate being movable to a first position or a second position by said shaft;
   a first switch being mounted in said housing and a second switch being mounted in said housing, said plate actuating said first switch when said plate moves to a first position and actuating said second switch when said plate moves to a second position;
   said tether being engaged with said shaft and rotating said shaft toward said first and second positions when said hitch and hitch connector are unaligned with each other; and
   a display screen being in communication with said first and second switches, said display screen indicating required movement of said hitch relative to said hitch connector to align said hitch and said hitch connector.

7. The system according to claim 6, further including a coupler being mounted on said housing to frictionally couple said housing to said hitch, said coupler being attached to said bottom wall and having a well extending therein, said well receiving and frictionally coupling to said hitch.

8. The system according to claim 6, further including a catch being attached to said shaft and extending into said opening, said catch engaging said tether, said catch pivoting said shaft when said tether moves laterally in said opening.

9. The system according to claim 6, further including a guide marker being attached to said housing, said guide marker indicating said front side of said housing.

10. A hitch alignment assisting system comprising:
    a hitch and a hitch connector;
    a housing being removably mounted on said hitch, said housing having a bottom wall, a top wall and a peripheral wall extending between and attached to said top and bottom walls, said peripheral wall having an opening therein, said opening being positioned in a front side of said housing, a coupler being mounted on said housing to frictionally couple said housing to said hitch, said coupler being attached to said bottom wall and having a well extending therein, said well receiving and frictionally coupling to said hitch;
    a spool being rotatably mounted in said housing, said spool having a vertically oriented rotational axis, rotation of said spool being biased in a first direction;
    a tether being attached to and wound on said spool, said tether having a free end extending through said opening in said housing, said free end of said tether being removably coupled to said hitch connector, said front side of said housing being aligned with a correct alignment of said hitch and said hitch connector;
    a shaft being rotatably mounted in said housing;

a plate being attached to said shaft, said plate being movable to a first position or a second position by said shaft;

a first switch being mounted in said housing and a second switch being mounted in said housing, said plate actuating said first switch when said plate moves to a first position and actuating said second switch when said plate moves to a second position;

a catch being attached to said shaft and extending into said opening, said catch engaging said tether, said catch pivoting said shaft when said tether moves laterally in said opening;

a display screen being in communication with said first and second switches, said display screen indicating required movement of said hitch relative to said hitch connector to align said hitch and said hitch connector, said hitch requiring movement to the left when said first switch is actuated and said hitch requiring movement to right when said second switch is actuated; and a guide marker being attached to said housing, said guide marker indicating said front side of said housing.

\* \* \* \* \*